(12) United States Patent
Kolodner et al.

(10) Patent No.: US 12,315,250 B2
(45) Date of Patent: May 27, 2025

(54) OBJECT DETECTION OVER WATER USING NORMALIZED DIFFERENCE VEGETATION INDEX SYSTEM AND METHOD

(71) Applicant: The Johns Hopkins University, Baltimore, MD (US)

(72) Inventors: Marc A. Kolodner, Gaithersburg, MD (US); Shea T. Hagstrom, Columbia, MD (US); Leo A. Morris, Severna Park, MD (US)

(73) Assignee: The Johns Hopkins University, Baltimore, MD (US)

( * ) Notice: Subject to any disclaimer, the term of this patent is extended or adjusted under 35 U.S.C. 154(b) by 494 days.

(21) Appl. No.: 17/727,265

(22) Filed: Apr. 22, 2022

(65) Prior Publication Data

US 2023/0005261 A1    Jan. 5, 2023

Related U.S. Application Data

(60) Provisional application No. 63/217,435, filed on Jul. 1, 2021.

(51) Int. Cl.
| | | |
|---|---|---|
| *G06V 20/10* | (2022.01) | |
| *G06V 10/764* | (2022.01) | |
| *G06V 20/52* | (2022.01) | |

(52) U.S. Cl.
CPC .......... *G06V 20/194* (2022.01); *G06V 10/764* (2022.01); *G06V 20/188* (2022.01); *G06V 20/52* (2022.01)

(58) Field of Classification Search
CPC . G06T 2207/10032; G06T 2207/30188; G06T 2207/10036; G06V 20/10–194
See application file for complete search history.

(56) References Cited

U.S. PATENT DOCUMENTS

| | | | |
|---|---|---|---|
| 2004/0119819 A1* | 6/2004 | Aggarwal | ........ G08B 13/19641 |
| | | | 348/E7.086 |
| 2023/0196743 A1* | 6/2023 | Seo | ...................... G06V 10/763 |
| | | | 382/103 |

FOREIGN PATENT DOCUMENTS

CN    107609534 A  *  1/2018

OTHER PUBLICATIONS

Versteegen, Jesse, et al. "On payload spatial and spectral resolutions for automatic ship detection in satellite images." 2018 Fifth International Workshop on Earth Observation and Remote Sensing Applications (EORSA). IEEE, 2018. (Year: 2018).*

(Continued)

*Primary Examiner* — Raphael Schwartz
(74) *Attorney, Agent, or Firm* — Todd R. Farnsworth

(57) ABSTRACT

A method and a system for object detection over water are provided. The method includes acquiring, from a storage system, image data associated with a target area. The image data includes radiance of a plurality of pixels in a first spectral band and in a second spectral band. The method also includes determining a metric corresponding to a pixel of the plurality of pixels as a function of the radiance in the first spectral band and the radiance in the second spectral band and detecting an object in the target area in response to a determination that the metric satisfies a criteria.

17 Claims, 9 Drawing Sheets

(56) References Cited

OTHER PUBLICATIONS

Xiaoyang Xie, Ship Detection in Multispectral Satellite Images Under Complex Environment, Remote Sensing, Mar. 2, 2020, pp. 19, vol. 12, Issue 5, p. 792, MDPI.

Gisgeography, What is NDVI (Normalized Difference Vegetation Index)?, Oct. 29, 2021, pp. 12, available at: https://gisgeography.com/ndvi-normalized-difference-vegetation-index/, last accessed Apr. 20, 2022.

* cited by examiner

800

OBJECT DETECTION OVER WATER USING NORMALIZED DIFFERENCE VEGETATION INDEX SYSTEM AND METHOD

CROSS-REFERENCE TO RELATED APPLICATIONS

This application claims the benefit of U.S. Provisional Application No. 63/217,435 filed on Jul. 1, 2021, the entire contents of which are hereby incorporated herein by reference.

STATEMENT OF GOVERNMENTAL INTEREST

This invention was made with Government support under contract number 70B02C19C00000093 awarded by the Department of Homeland Security. The Government has certain rights in the invention.

FIELD

The present disclosure relates to object detection over water, for example, a system and a method for object detection using normalized difference vegetation index.

BACKGROUND

Detection of objects over water has many applications including search and rescue, monitoring and surveillance, and security surveillance. For example, vessel detection is used in maritime security and surveillance applications (e.g., fishing vessels). Various images are used to survey and monitor scenes (e.g., oceans, seas, lakes). Such detection may be time consuming as it may involve intervention of a user or extensive model training. In addition, current techniques suffer from high rate of false detections due to atmospheric conditions while acquiring the images. These delays in processing can be significant enough such that a search or rescue mission or a surveillance mission may fail. What is needed are systems and methods to address the aforementioned problems, and to provide improved techniques for accurate and rapid object detection and localization.

SUMMARY

Accordingly, it is desirable to improve detection of objects over water to deliver enhanced capabilities while mitigating adverse impact of processing time and the like.

In some embodiments, a method includes acquiring, from a storage system, image data associated with a target area. The image data includes radiance of a plurality of pixels in a first spectral band and in a second spectral band. The method also includes determining a metric corresponding to a pixel of the plurality of pixels as a function of the radiance in the first spectral band and the radiance in the second spectral band and detecting an object in the target area in response to a determination that the metric satisfies a criteria.

In some embodiments, a system includes a memory and a processor. The memory is configured to store image data associated with a target area. The image data includes radiance of a plurality of pixels in a first spectral band and in a second spectral band. The processor is configured to determine a metric corresponding to a pixel as a function of the radiance in the first spectral band and the radiance in the second spectral band, and detect an object in the target area in response to a determination that the metric satisfies a criteria.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
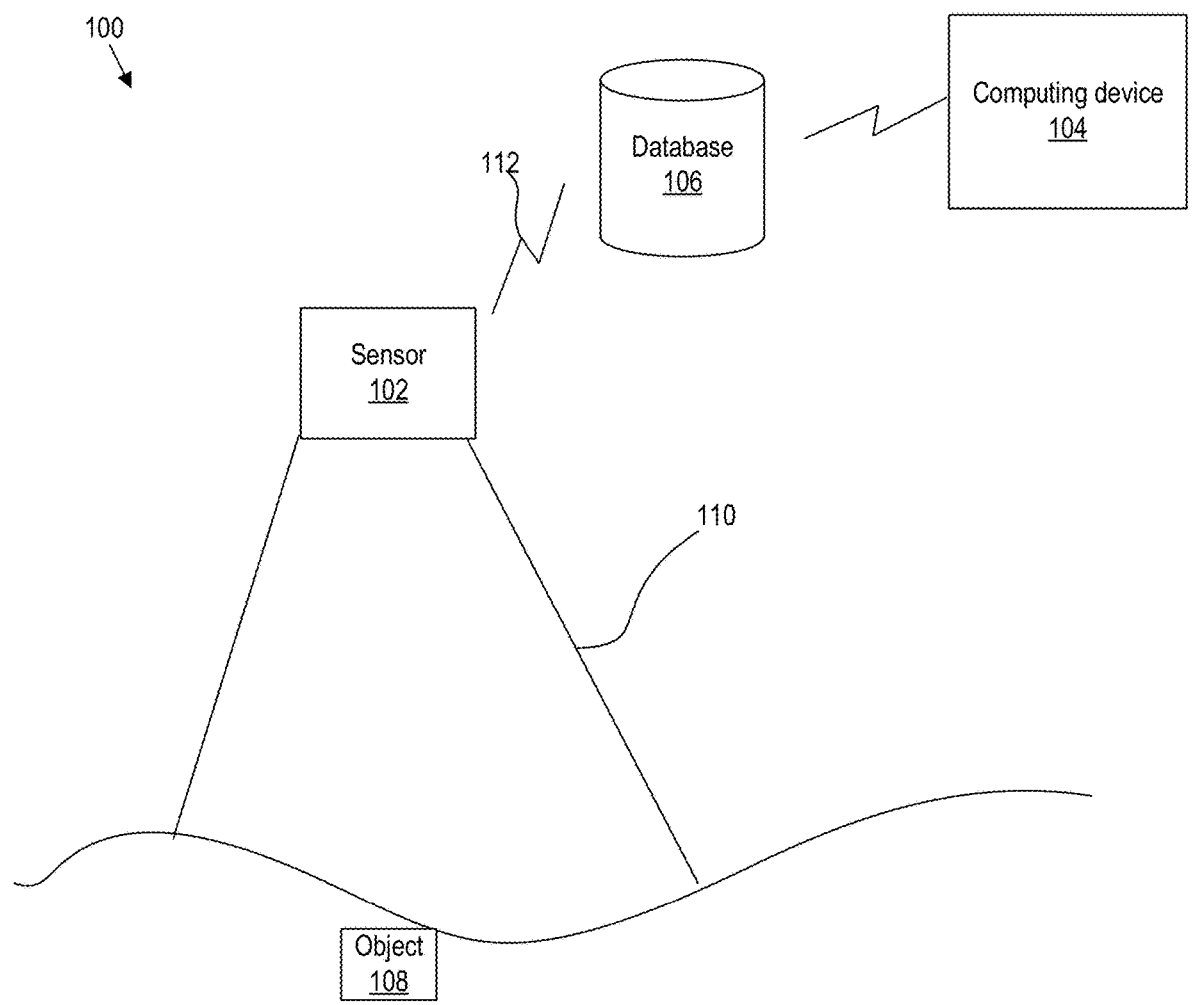
FIG. 1 is a schematic that illustrates a system for detecting an object, according to some embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5% ±10%, ±15%, or ±20% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc. In the context of computer storage media, the term "non-transitory" may be used herein to describe all forms of computer readable media, with the sole exception being a transitory, propagating signal.

Embodiments of the present disclosure are directed to object detection using normalized difference vegetation index (NDVI). Embodiments described herein may be used to, for example, detect an object and determine a location of the object using imagery data while reducing processing time. In some aspects, approaches described herein may be used to detect one or more objects in a body of water such as an ocean or a lake.

In some embodiments, the object may comprise a vessel. The systems and methods described herein may be used to locate the vessel (i.e., determine a location of the vessel) during a search and rescue operation. For example, when the vessel is unable to communicate with a third party (e.g., lost communication), the imagery data may be used to locate the vessel. In some embodiments, a size of the vessel may be in the range from about 6 meters to about 10 meters. The resolution of the imagery data may affect a minimum detectable length. That is, a size of a pixel of the image may be equal to the minimum detectable length of the object.

In some aspects, extensive testing can be performed to determine a robust capability with a high probability of detection and low false alarm rate to spectrally detect vessels in the open ocean among varying surface and atmospheric conditions including water currents, white caps, thin clouds, and cloud shadows.

Different materials have unique spectral reflectance. For example, healthy vegetation has a strong NDVI due to a red-edge increase in a near infrared (NIR) intensity. Thus, the NDVI may be used to calculate vegetation coverage. In some aspects, the detection of the object is based on a NDVI. While healthy vegetation has a strong NDVI due to a "red-edge" increase in the NIR intensity, man-made surfaces/materials found on some objects may have a measurable effect on the NIR band intensity relative to the red band intensity. For example, hydrocarbon materials found on vessels such as paints, polymers, and canopies have a measurable effect on the NIR band intensity relative to the red band intensity.

The imagery data may be used determine the NDVI. The imagery data may be captured using a plurality of techniques. For example, the imagery data may be captured using satellite imagery techniques. The satellite imagery techniques may comprise multispectral imagery (MSI), panchromatic imagery (PAN), and the like. Exemplary commercial space imaging satellites may include Worldview 2, GeoEye1, Worldview 3, and the SkySat constellation. In some aspects, the imagery data may be, for example, an electronic file in a geo tagged image file format (GeoTIFF) or in a National Imagery Transmission Format (NITF) (or other electronic format that may be downloaded from a data server).

The MSI may include several bands (e.g., blue band, green band, red band, NIR band). The red band may range from about 0.63 to about 0.69 microns and the NIR band may range from about 0.77 to 0.89 about microns.

The workflow described herein may also include a sequence of steps including a sun glint filter (to help remove images with large specular reflections that prevent robust vessel detection), a minimum NIR amplitude requirement (to help remove potential false alarms due to shadowing from white caps), and/or a contiguous pixel detection requirement (to help remove remaining single pixel false alarms from other effects such as sensor artifacts).

In some embodiments, the systems and methods described herein may perform batch processing on sequences of large satellite imagery collections in minutes, generating output that is seamlessly and clearly displayed in geographic information system (GIS) platforms.

FIG. 1 is a schematic that illustrates a system 100 for detecting an object 108, according to some embodiments. The system 100 may comprise a sensor 102, a computing device 104, and a database 106 (e.g., a storage system, data server, imagery server).

A sensor 102 may capture an image of a target area 110. The sensor 102 may be flown or positioned over the target area 110 on a satellite, an aircraft, a drone, or the like. The sensor 102 can comprise a plurality of image capture devices and/or a single device configured to capture images of the target area 110 in two or more spectral bands. The sensor 102 may be a multispectral imaging camera configured to capture one or more images in two or more spectral bands (i.e., multiband image). The image may be composed of a plurality of pixels. Each pixel of the plurality of pixels may have a radiance in two or more spectral bands (e.g., in the red band and in the NIR band). The sensor 102 can record the imagery data. The sensor 102 may transmit the imagery data to the database 106 via a network 112.

In some embodiments, the database 106 may be one or more databases or data sources such as a data lake. Although, only a single database 106 is shown, system 100 may include any number of databases or data sources. The database 106 may receive imagery data from the sensor 106 and store the imagery data. In some aspects, the database 106 can download/fetch the imagery data from the sensor 102 at preset intervals. The database 106 may store multiple imagery data associated with the target area. For example, the imagery data may include imagery data collected at different times/date and/or from different types of sensors. For example, the imagery data may include panchromatic imagery (PAN) along with MSI imagery data or hyperspectral imagery (HSI) data. The database 106 may associate the MSI imagery data for the target area 110 with the imagery data. In some aspects, the MSI imagery data and the PAN may have the same file name with a different extension.

The database 106 may be communicatively coupled to the computing device 104. The computing device 104 can retrieve the imagery data from the database 106 and process the imagery data associated with the target area 110. In one aspect, the computing device 104 may download the imagery data via file transfer protocol (FTP). In some aspects, the imagery data may be processed within a predetermined time period, e.g., less than four hours after the imagery data is captured. The computing device 104 may detect the object 108 in the target area 110 based on the NDVI. The NDVI may be determined from the MSI imagery data as discussed further below.

In some aspects, functions of the computing device 104 may be implemented on one or more servers. The servers may be a variety of centralized servers and/or may be a variety of centralized or decentralized computing devices. For example, a server may be a mobile device, a laptop computer, a desktop computer, grid-computing resources, a virtualized computing resource, cloud-computing resources, peer-to-peer distributed computing devices, a server farm, or a combination thereof. The servers may be centralized in a single room, distributed across different rooms, distributed across different geographic locations, or embedded within the network 112.

In some embodiment, the network 112 refers to a telecommunications network, such as a wired or wireless network. The network 112 can span and represent a variety of networks and network topologies. For example, the network 112 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 112. Cable, Ethernet, digital subscriber line (DSL), fiber optic lines, fiber to the home (FTTH), and plain old telephone service (POTS) are examples of wired communication that may be included in the network 112. Further, the network 112 can traverse a number of topologies and distances. For example, the network 112 can include a direct connection, personal area network, local area network (LAN), metropolitan area network (MAN), wide area network (WAN), or a combination thereof.

After the computing device 104 detects one or more objects, the computing device 104 may output a representation of the object along with the imagery data. In some embodiments, the detected object may be output with one or more images collected at different times or from different kinds of sensors (e.g., hyperspectral, long wave infrared (LWIR)). In some embodiments, the computing device 104 may retrieve from the database 106 an MSI image and a PAN image of the target area 110. The computing device 104 may output the PAN image with the MSI image when the object 108 is detected in the target area 110.

Panchromatic imagery may have a higher spatial resolution compared to MSI imagery (e.g., from about 30 cm to several meters), but MSI may have a higher spectral resolution compared to PAN. In some aspects, PAN imagery may be a grayscale. In some aspects, MSI images may be combined with the PAN image using a PAN sharpening technique. PAN sharpening techniques may combine two or more bands from the multispectral image with the high spatial resolution PAN image to produce an image that has spatial and spectral properties of both image types. The PAN sharpened image may be output along with an indication of a location of the detected object.

In some embodiments, the computing device 104 may download multiple images covering the target area 110. For example, twenty images covering the target area 110 may be acquired. Imagery data is downloaded from the database 106 and analyzed in parallel or sequentially by the computing device 104. The imagery data may be downloaded with a corresponding metadata file. In some aspects, a user may use a grid map to select the imagery data to be downloaded in response to a search or rescue mission. The computing device 104 may also be configured to receive an input from the user. The input may include a set of threshold values used to detect the object and minimize false positive detection as described further below.

Figure 2:
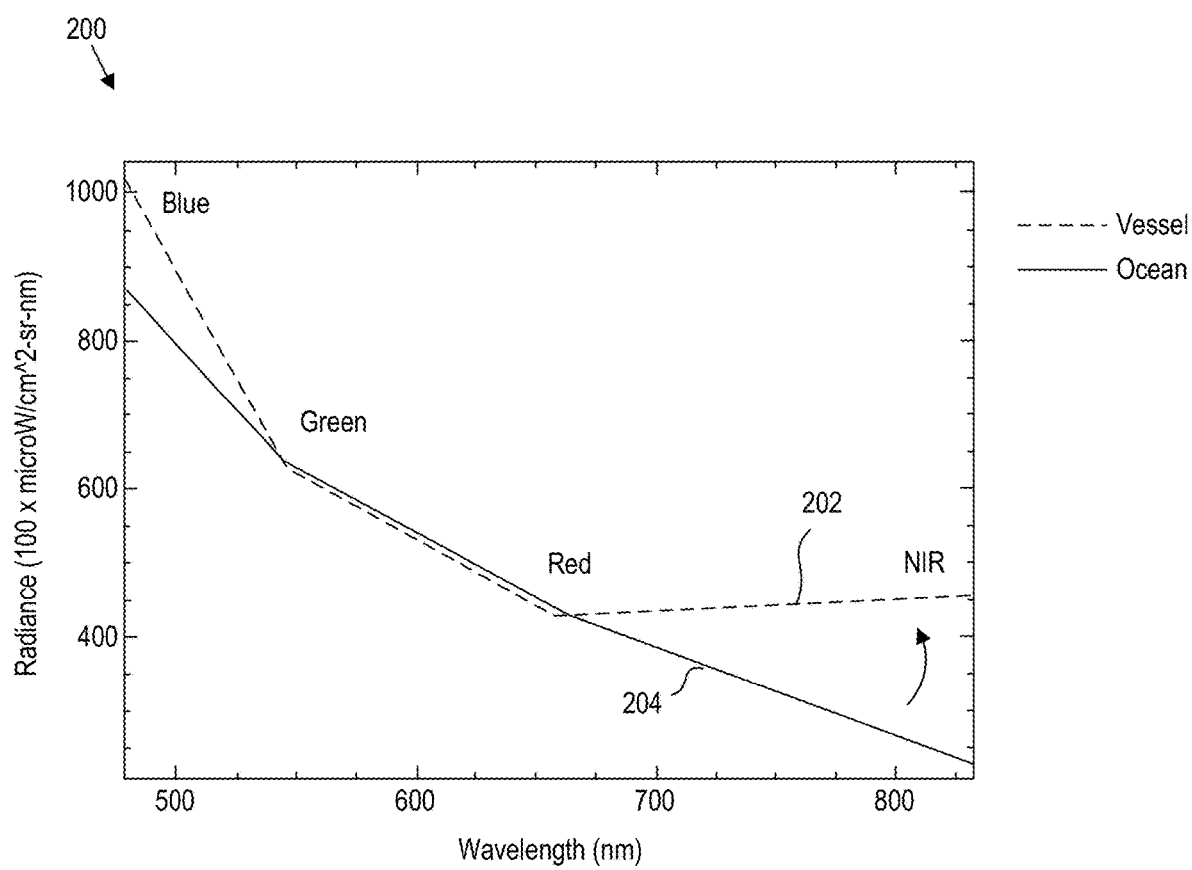
FIG. 2 is a graph that illustrates spectra at multiple bands for a vessel and a body of water, according to some embodiments.

FIG. 2 is a graph 200 that illustrates spectra at multiple bands for a vessel and a body of water (e.g., ocean), according to some embodiments. For example, curve 202 shows the spectra associated with the vessel and curve 204 shows the spectra associated with the body of water. In one aspect, the spectra is shown from a blue band to the NIR band (i.e., from about 500 nm to about 900 nm). For example, curve 202 shows there is a flattening effect in the NIR for the vessel compared to the body of water (curve 204). That is, the radiance in the NIR band may remain substantially flat for the vessel. However, the radiance in the NIR band for the body of water may have a non-flat response. This difference in the spectral response between the body of water and the vessel may provide a difference in the NDVI, which may be used to help detect the presence of an object (e.g., a boat, vessel, etc.) in a body of water.

Figure 3:
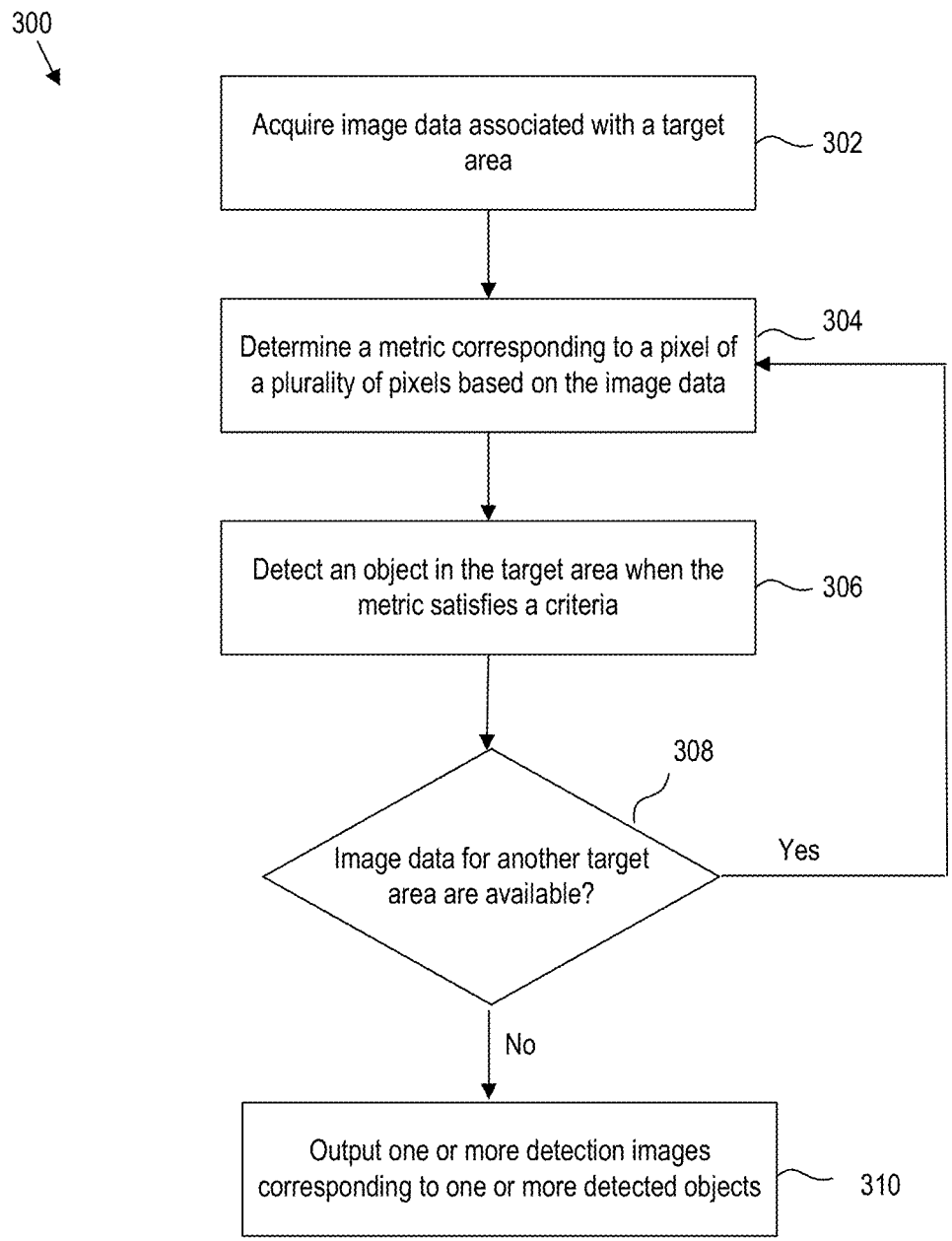
FIG. 3 is a flowchart for a method for detecting an object, according to some embodiments.

The flattening effect in the NIR for a vessel may primarily be due to dielectric properties and solar reflectivity of the hydrocarbon materials (e.g. polymer plastic) that reside on a surface of the vessel. This may result in a detectable difference in the NDVI for a vessel when compared to the body of water. FIG. 3 shows a flowchart for a method 300 for detecting an object, according to some embodiments.

In one aspect, in operation 302, imagery data associated with a target area is acquired. The imagery data may comprise radiance of a plurality of pixels in a first spectral band and in a second spectral band. In some embodiments, the first spectral band and the second spectral band may be selected such as the spectra of a potential object and the spectra of the open area where a potential object may be located diverge. That is, the spectral response of an object and the spectral response of the open area in one or more bands are not identical. In some embodiments, the first spectral band can comprise a near infrared (NIR) band, and the second spectral band can comprise a red band.

In some embodiments, one or more images (e.g., two-dimensional images) may be acquired. The images may be obtained externally via a network, such as network 926 with respect to FIG. 9 or network 112 of FIG. 1. Additionally or alternatively, the images may be obtained from a library or a database, such as the memory 910 as described with respect to FIG. 9 or database 106 of FIG. 1.

Figure 8:
FIG. 8 shows a normalized difference vegetation index (NDVI) image, according to some embodiments.

In one aspect, in operation 304, a metric corresponding to a pixel of the plurality of pixels is determined based on the imagery data. The metric may be based on the radiance in the first spectral band and the radiance in the second spectral band. The metric may correspond to the NDVI. The NDVI may be expressed as:

$$NDVI=(NIR-R)/(NIR+R) \qquad (1)$$

where NIR corresponds to the radiance in the NIR band and R corresponds to the radiance in the red band. An example NDVI image is shown in FIG. 8. The NDVI is determined for each pixel of the plurality of pixels using equation (1).

In one aspect, in operation 306, an object is detected in the target area when the metric satisfies a criterion. For example, the metric may be compared with a threshold. In some aspects, the criterion may be satisfied when the metric exceeds the threshold. In some embodiments, a threshold value may be determined based on processing of a plurality of imagery collections at a plurality of locations (i.e., empirically derived). For example, the threshold value may be varied and the threshold value that leads to an accurate detection level and low risk of false detection may be selected. In some aspects, the threshold value may be input by the user as described further below.

In some embodiments, additional criteria may be used to reduce the risk of false detections. For example, a minimum contiguous detection and a minimum NIR may be used to reduce the risk of false detection.

A set of contiguous pixels satisfying the criterion may be used in order to validate the detection (i.e., a pixel having the metric exceeding the threshold). That is, each metric corresponding to each pixel of the set of contiguous pixels exceeds the threshold. If, for example, the number of contiguous pixels is less than a contiguous pixels threshold than the detected object is classified as a false detection.

In some embodiments, a total number of detected objects in a target area is determined. In some aspects, the detected objects are classified as false detection when the total number of the detected object exceeds a glint threshold (i.e., a maximum number of objects).

In some embodiments, a radiance of the pixel in the first band is compared to a radiance threshold. For example, the radiance of the pixel associated with the detected object in the NIR band is compared to a NIR threshold. If the radiance of the pixel does not exceed the NIR threshold, the detected object may be classified as a false detection.

In one aspect, in operation 308, a determination is made whether additional imagery data are available. Imagery data may correspond to the previous target area or an additional target area. In some aspects, multiple images may cover the target area.

In response to determining that there is additional imagery data available, i.e., YES at 308, the process proceeds to step 304.

In response to determining that there is no more image data available, i.e., NO at 308, the process proceeds to step 310.

In one aspect, in operation 310, a detection image is output to the user. The detection image may be representative of metrics of the plurality of pixels. For example, the metric may correspond to the NDVI and the detection image may correspond to the NDVI image (e.g., NDVI image shown in FIG. 8). The detection image may correspond to one or more detected objects. In some aspects, the detected objects classified as a false detection are not output in the detection image. The detection image may change one or more attributes of the pixels corresponding to the detected object. In some aspects, the detected object may be represented by a pin.

It should be understood that some of the above steps of the flow diagram of FIG. 3 can be executed or performed in an order or sequence other than the order shown and described in the figure. Further, some of the above steps may be performed well in advance of other steps, or may be executed or performed substantially simultaneously or in parallel.

The operations of method 300 are performed, for example, by system 100, in accordance with aspects described above.

Figure 4:
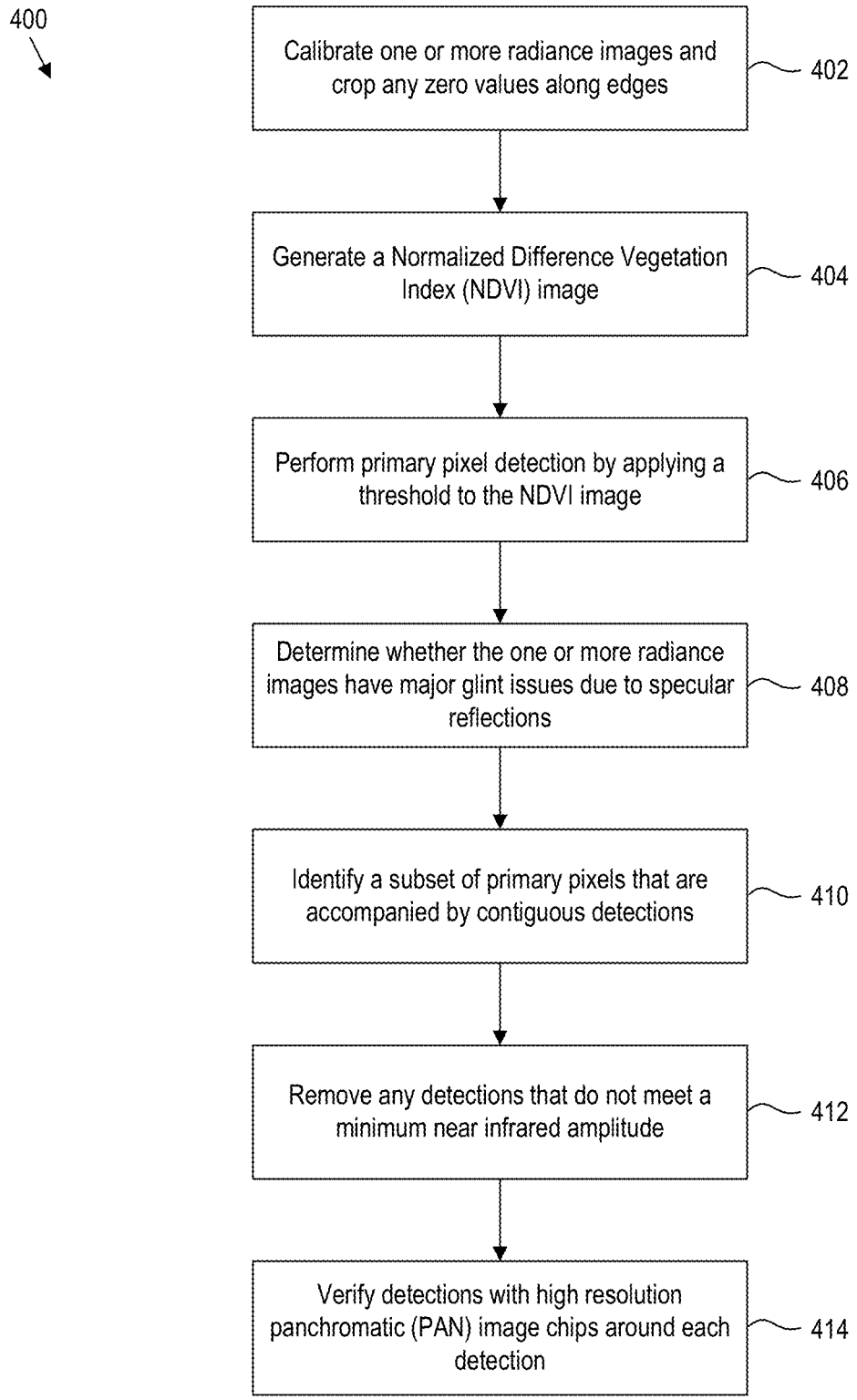
FIG. 4 is a flowchart for a method for detecting an object, according to some embodiments.

FIG. 4 shows a flowchart for a method 400 for detecting an object, according to some embodiments.

In one aspect, in operation 402, imagery data (e.g., radiance or reflectance image) is acquired and are calibrated. Radiance image may refer to an intensity image. In some aspects, zero values along the edges of the radiance images are cropped. In some aspects, the imagery data may comprise spectral radiance for two or more bands. In some aspects, the imagery data may comprise an MSI data set. In some aspects, the MSI data set acquired from database 106 may be previously calibrated (i.e., calibrated before downloading the set from the database).

When the MSI data set is not previously calibrated, the information used to calibrate the images is provided and acquired with the imagery data. For example, a set of coefficients used to calibrate the images is retrieved with the imagery data. A different coefficient may be used to calibrate raw data in each band of the two or more bands. Calibrating the raw data ensures that the bands are being compared correctly in radiance engineering units, for example, microWatts/(square cm-steradian-nm).

In some embodiments, the radiance image may be provided as an electronic file in a geo tagged image file format (GeoTIFF) or in a national imagery transmission format (NITF). The electronic file may include the image data in a binary file format and at least one other file with information about the image file (e.g., geolocation information, satellite source, time of collection, and sun/satellite collection geometry).

In some embodiments, the imagery data may include an image pair including panchromatic and multispectral images and associated metadata. The metadata may include a date and time associated with when the imagery data were acquired, a position of the sensor acquiring the imagery data, coordinates of the location being imaged, and other identifying information. The other identifying information may include one or more values used by the sensor for acquiring the imagery data (i.e., settings of the sensor).

In one aspect, in operation 404, an NDVI image is generated. The NDVI image may be generated by determining the NDVI for each pixel of the image. As described previously herein, the NDVI is determined as a function of the radiance in the red band and the radiance in the NIR band. For example, the NDVI for each pixel may be determined using equation (1). In some aspects, the NDVI may range from −1 to +1. Negative values of NDVI may indicate water. Traditionally, an NDVI value close to +1, for example, may be associated with dense green leaves. A low reflectance in the red channel and a high reflectance in the NIR channel yield a high NDVI value and vice versa. Healthy vegetation (chlorophyll) reflects more NIR and green light compared to other wavelengths but it absorbs more red and blue light.

In one aspect, in operation 406, primary pixel detection is performed by applying a NDVI threshold to the NDVI image. For example, exceeding the NDVI threshold may indicate that the pixel corresponds to an object. The NDVI threshold may be set by the user or pre-stored in the system. In some aspects, the NDVI threshold may be a function of the slope of curve 202 in the NIR region. For example, a NDVI threshold of zero may indicate a flat change in the response of the object from the red band to the NIR band. A negative index may indicate a downward slope. A positive index may indicate an upward slope. The NDVI threshold may be negative, positive, or equal to zero and may be adjusted by the user.

In some aspects, a range of NDVI threshold may be from about −0.075 to about −0.050. A higher number may reduce detections and false alarms.

In one aspect, in operation 408, a check may be performed to ensure that the images have no major glint issues due to specular reflections. For example, the number of pixels in the NDVI image having the NDVI exceeding the threshold is determined. In some aspects, if the number of pixels exceeds a glint threshold, then the image is not processed (i.e., is not used to detect objects). That is, none of the pixels that exceed the NDVI threshold is classified as an object. The high number of pixels exceeding the NDVI threshold may indicate that the imagery data have a glint issue and may not be suitable for object detection. In some embodiments, the glint threshold may range from about 500 pixels to about 1000 pixels. A lower number may reduce detections and false alarms. In some aspects, the glint threshold may be selected by the user based on an expected number of objects in the target area. For example, when the expected number of objects is small (e.g., less than 100) the user may select a glint threshold of 500 pixels.

In some embodiments, additional images of the same area captured at a different time of the day may be processed (i.e., relative position of the sun and satellite is less susceptible for glint). In some aspects, the additional images may be captured before or after few hours from the imagery data. For example, when the image is not processed due to the glint issue, additional imagery data associated with the same target area are retrieved from the database 106 and processed.

In addition to the glint filter, a filter may be used to filter out areas of land captured in the image. For example, when the number of pixels exceeds the glint threshold, the image may not be processed or the image may be cropped to remove a sub-area where a high number of pixels exceeds the glint threshold. The concentration of pixels exceeding the threshold may be indicative of an area of land.

In one aspect, in operation 410, a subset of primary pixels that are accompanied by contiguous detections is identified. Primary pixels may refer to each pixel having a metric that exceeds a primary NDVI threshold. For each primary pixel, the processor may check whether a contiguous pixel also exceeds a contiguous NDVI threshold. In some aspects, contiguous pixels may be defined as two or more pixels having at least a border and/or a corner in common. In some aspects, the pixels may be contiguous upward, downward, right and/or left. For each primary pixel, the number of contiguous pixels that exceeds the threshold is determined. In some aspects, only contiguous pixels are identified as objects. For example, two or more contiguous pixels may exceed the threshold (NDVI index threshold) for the object to be detected. The number of contiguous pixels may be compared to a contiguous pixels threshold (minimum contiguous pixels). When the number of contiguous pixels is less than the contiguous pixels threshold the primary pixel is classified as a false detection. In some aspects, this condition is removed and a single pixel exceeding the index may correspond to an object.

The contiguous pixels threshold may be set by the user. The contiguous pixels threshold may be adjusted based on a type of the object to be detected. For example, an attribute (e.g., size) of the object may be input and the contiguous pixels threshold may be determined based on the input. In some aspects, an approximate length of the object may be input to computing device 104 and the computing device 104 may adjust the number of contiguous pixels based on the length. For example, if the size of the expected object (e.g., debris from an airplane) is relatively small (i.e., less than two pixels), the user may set the contiguous pixels threshold to one pixel. If the size of the expected object exceeds certain dimensions (i.e., more than two pixels) then the contiguous pixels threshold may be increased to minimize the risk of false detection. In some embodiments, contiguous pixels threshold may range from 2 to 3 contiguous pixels.

In some embodiments, a minimum contiguous NDVI threshold may be equal to or different from the NDVI threshold used to detect the primary pixel (i.e., in 406). In some aspects, a range of the minimum contiguous NDVI threshold may be from about −0.1 to −0.075. A higher number may reduce detections and false alarms.

In one aspect, in operation 412, a radiance of the primary pixel may be compared with a radiance threshold. For example, the radiance of the primary pixel in the NIR band may be compared with a minimum NIR amplitude. Any detection that does not meet the minimum NIR amplitude is removed. Due to conditions (e.g., atmospheric conditions) when the imagery data was captured, some pixels in the image may have a low NIR which may lead to a flat slope, that is an index (i.e., NDVI) exceeding the threshold value that in turn leads to a false positive detection. In some aspects, a range of the minimum NIR amplitude may be from about 2 to 3 microflicks. In some embodiments, the minimum NIR may be equal to 1 microflick. A higher number may reduce detections and false alarms.

In one aspect, in operation 414 detections are verified using high resolution images (e.g., a PAN image). For each detection, a high resolution image comprising the detected object is retrieved. As described previously, each MSI image may have a corresponding high resolution image. The high resolution image may be presented to the user on a graphical user interface next to the MSI image. The user may compare the image and confirm the detection.

The operations of method 400 are performed, for example, by system 100, in accordance with aspects described above.

It should be understood that some of the above steps of the flow diagram of FIG. 4 can be executed or performed in an order or sequence other than the order shown and described in the figure. Further, some of the above steps may be performed well in advance of other steps, or may be executed or performed substantially simultaneously or in parallel.

Figure 5:
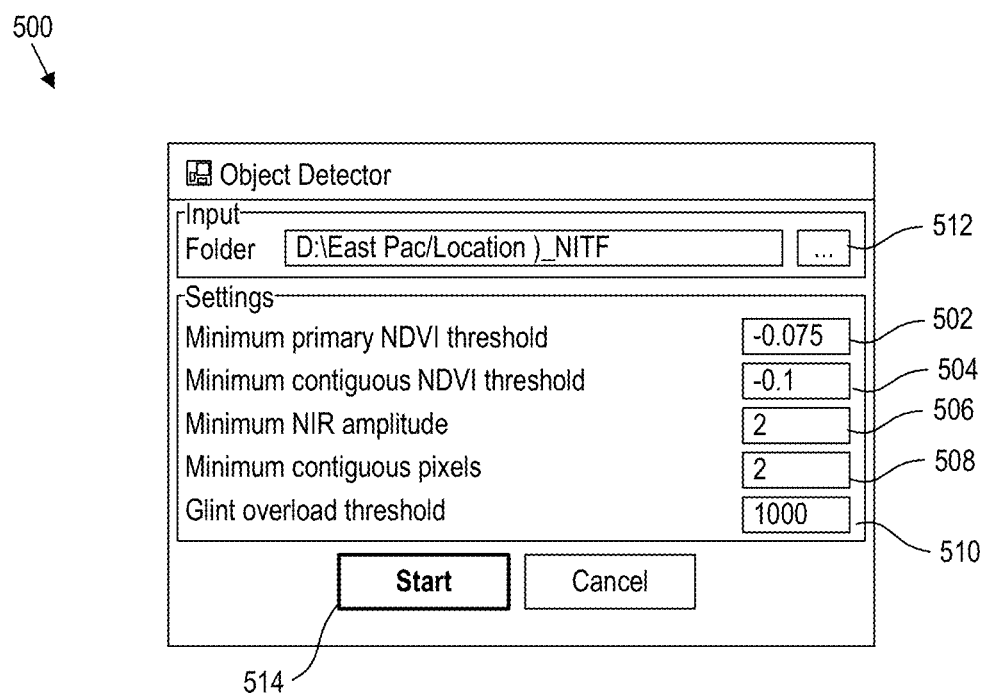
FIG. 5 is a schematic for a graphical user interface for the system for detecting an object, according to some embodiments.
Figure 6:
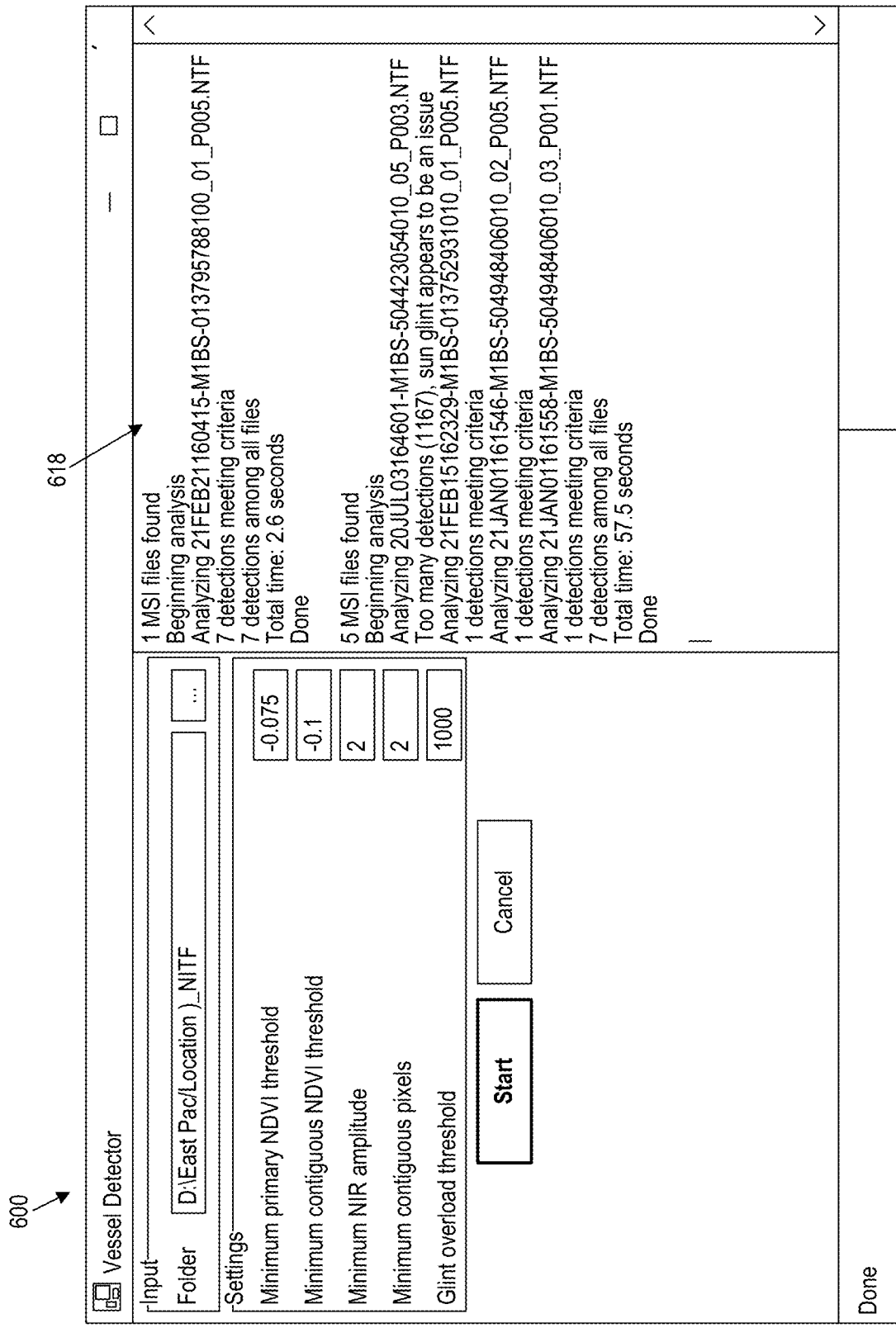
FIG. 6 is a schematic for a graphical user interface for the system for detecting an object, according to some embodiments.

FIG. 5 and FIG. 6 illustrate exemplary user interfaces for system 100, in accordance with some embodiments of the present disclosure. For example, user interfaces shown in FIGS. 5-6 can be part of system 100 and configured to allow a user to interact with system 100 and the computer device 104.

Starting with reference to FIG. 5, upon login to the computer device 104, the user may be presented with GUI 500. The user may be presented with an input field 512. Upon selecting the input field 512, the user may be presented with a folder directory to select the imagery data.

The user may be presented with a settings pane that includes one or more fields to enter the one or more thresholds described previously herein. A first field 502 may be used to input the NDVI threshold. A second field 504 may be used to input the minimum contiguous NDVI threshold. A third field 506 may be used to input a minimum NIR amplitude. A fourth field 508 may be used to input the minimum contiguous pixels. A fifth field 510 may be used to input the glint overload threshold. In some aspects, the one or more fields may be prepopulated with preset values.

A control field 514 may be used to start the processing of the imagery data. Upon activation of the control field 514, the user may be presented with user interface, e.g., graphical user interface (GUI) 600, shown in FIG. 6. GUI 600 may include a progress pane 618. The progress pane 618 may output the number of files located in the folder selected. The number of objects detected in each file and the total number of detections.

The progress pane 618 may show the file (i.e., MSI) being analyzed. If a file is skipped due to glint as discussed previously herein, a display attribute of the file name may be changed. For example, the name of the file may be displayed in color (e.g., in red). The attribute of the file may also be changed if a PAN file corresponding to the MSI file is not located. For example, the file name may be displayed in orange. The progress pane 618 may also display the total time of the simulation.

In addition to the progress pane 618, the GUI 600 may include a status pane 616. The status pane 616 may show the status of the simulation (all files). For example, "Done" may be displayed when all imagery data has been processed. Another status pane (not shown) may show the completion status for the MSI file being analyzed.

The example shown in FIG. 6 corresponds to the simulation of two separate folders. The first folder includes one MSI file and seven objects were detected. The second folder includes five MSI files and seven objects were detected among the five MSI files. In addition, the progress pane 618 shows that detections from a file from the second folder were skipped due to the high number of detections.

Figure 7:
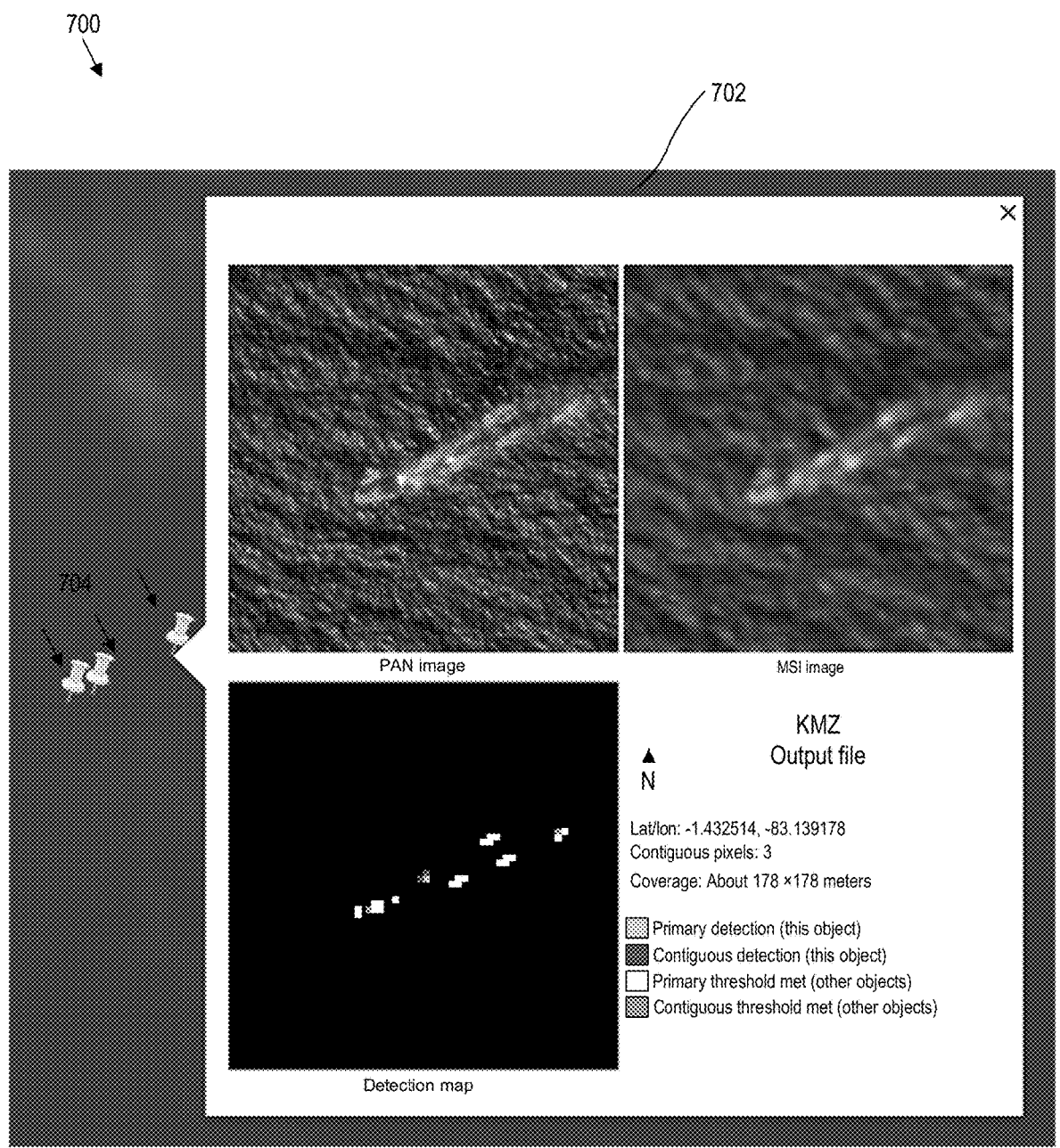
FIG. 7 is a schematic that shows an output of the system for detecting an object, according to some embodiments.

FIG. 7 is a schematic 700 that shows an output of the system 100 for detecting an object, in accordance with an embodiment of the present disclosure. The output may be in, for example, the form of a keyhole markup language (KML) or a compressed version of the KML (KMZ) output file.

For each target area, a PAN image, a MSI image, and a detection image may be displayed. A detected object may be represented by a pin 704 on the map. The number of pins may match the total number of detections for each input folder. Associated with each pin 704 is a pane 702. The pane 702 may include the file name for the detection, the latitude and longitude coordinates in decimal degrees, the number of contiguous pixels, and the approximate extent of the displayed map. In some embodiments, the latitude and longitude coordinates can be copied to another application. For example, the latitude and longitude coordinates may be copied by highlighting the coordinates with the left mouse button and copying with the right mouse button.

In the detection map, the display attribute of the pixel may be indicative of the primary detection threshold associated with the pin, pixels meeting the contiguous detection threshold for the detection associated with the pin 704, other pixels in the image display meeting the primary detection threshold, and other pixels in the image display meeting the contiguous detection threshold. The pane 702 may also include a legend for the detection map.

Each image can be copied by right mouse clicking over the image of interest and pasting into any editor (e.g. MS Word or PowerPoint). The images are provided at a full pixel resolution and can be zoomed in to as needed. The PAN image may be centered and zoomed to the object.

In some embodiments, a pan-sharpened image of the detection may be output. A user may input the latitude and longitude coordinates of the detection in a tool that has pan-sharpening capabilities such as global enhanced geospatial intelligence delivery (G-EGD), environmental systems research institute (ESRI), or RemoteView™. Computing device 104 may also connect to the database 106 to download the pan-sharpened image corresponding to the latitude and longitude coordinates of the detection.

FIG. 8 shows a NDVI image 800 of a target area, in accordance with an embodiment of the present disclosure. The target area may be a hazy area over a body of water having a size of ⅔ of km by ⅔ of km. For example, the area shows two fishing boats (i.e., about 27 feet in length) shown as white dots at the end of the black arrows. In this example, the detected objects, the white dots, have a higher NDVI than the background.

Figure 9:
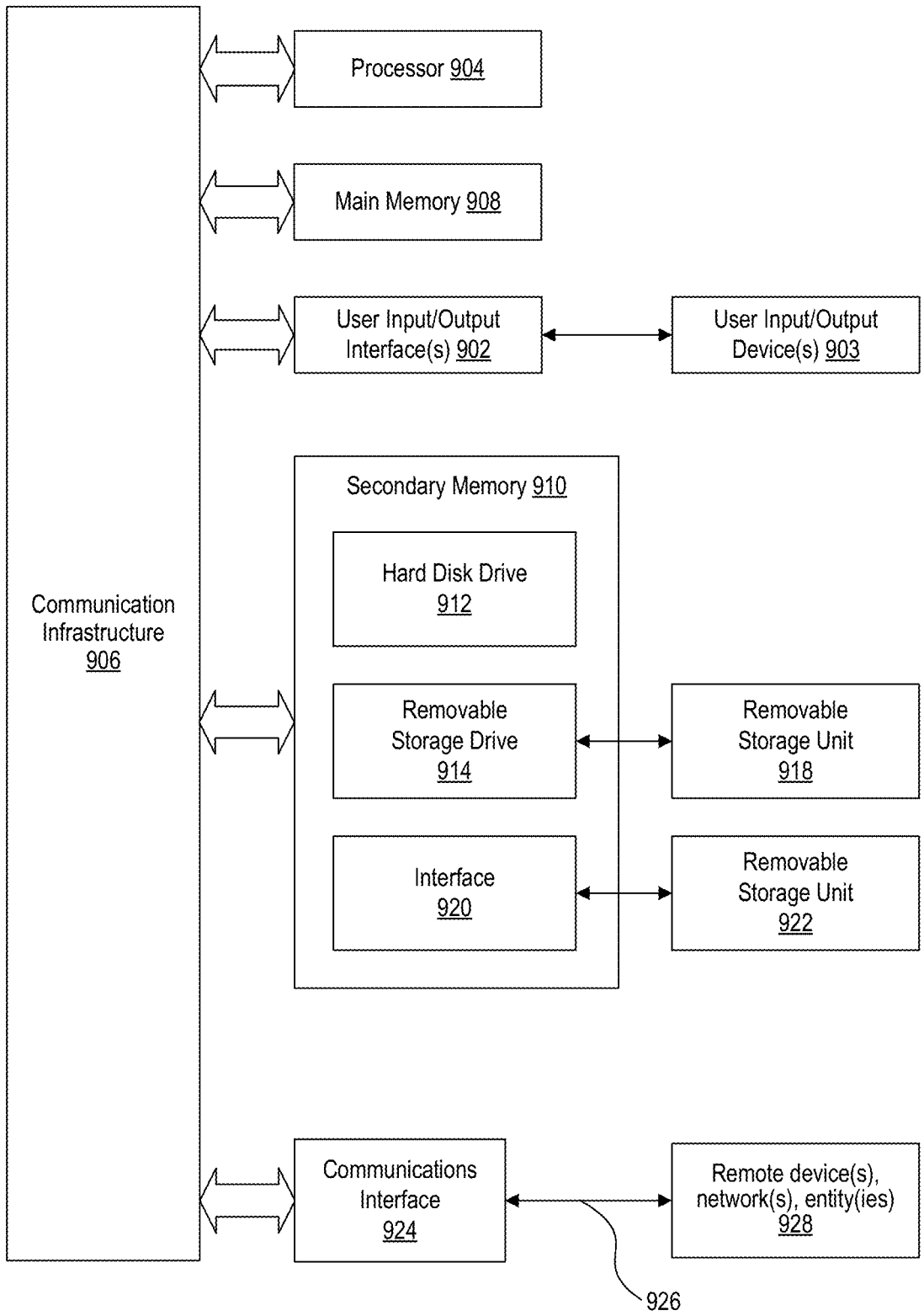
FIG. 9 shows a computer system for implementing various embodiments of this disclosure.

FIG. 9 shows a computer system 900, according to some embodiments. Various embodiments and components therein can be implemented, for example, using computer system 900 or any other well-known computer systems. For example, the method steps of FIG. 3 and FIG. 4 may be implemented via computer system 900.

In some embodiments, computer system 900 may comprise one or more processors (also called central processing units, or CPUs), such as a processor 904. Processor 904 may be connected to a communication infrastructure or bus 906.

In some embodiments, one or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

In some embodiments, computer system 900 may further comprise user input/output device(s) 903, such as monitors, keyboards, pointing devices, etc., that communicate with communication infrastructure 906 through user input/output interface(s) 902. Computer system 900 may further comprise a main or primary memory 908, such as random access memory (RAM). Main memory 908 may comprise one or more levels of cache. Main memory 908 has stored therein control logic (i.e., computer software) and/or data.

In some embodiments, computer system 900 may further comprise one or more secondary storage devices or memory 910. Secondary memory 910 may comprise, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive. removable storage drive 914 may interact with a removable storage unit 918. Removable storage unit 918 may comprise a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

In some embodiments, secondary memory 910 may comprise other means, instrumentalities or other approaches for allowing computer programs and/or other instructions and/or data to be accessed by computer system 900. Such means, instrumentalities or other approaches may comprise, for example, a removable storage unit 922 and an interface 920. Examples of the removable storage unit 922 and the interface 920 may comprise a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some embodiments, computer system 900 may further comprise a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may comprise any combination of LANs, WANs, the Internet, etc. Control logic and/or data may be transmitted to and from computer system 900 via communications path 926.

In some embodiments, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to those skilled in the relevant art(s) how to make and use embodiments of this disclosure using data processing devices, computer systems and/or computer architectures other than that shown in FIG. 9. In particular, embodiments may operate with software, hardware, and/or operating system implementations other than those described herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A method, comprising:
   acquiring, from a storage system, image data associated with a target area over water, wherein the image data comprises radiance of a plurality of pixels in a first spectral band and in a second spectral band, wherein the first spectral band comprises a near infrared (NIR) band and the second spectral band comprises a red band;
   determining, using a processor, a normalized difference vegetation index (NDVI) metric corresponding to a pixel of the plurality of pixels as a function of the radiance in the first spectral band and the radiance in the second spectral band; and
   detecting, using the processor, a man-made object in the target area in response to a determination that the NDVI metric exceeds a threshold.

2. The method of claim 1, wherein:
   the NDVI is expressed as NDVI=(NIR−R)/(NIR+R),
   NIR corresponds to the radiance in the NIR band and R corresponds to the radiance in the red band.

3. The method of claim 1, wherein:
   the detecting the object comprises identifying a set of contiguous pixels representing the object, and
   each NDVI metric corresponding to each pixel of the set of contiguous pixels exceeds the threshold.

4. The method of claim 3, further comprising:
   in response to a number of pixels in the set of the contiguous pixels being less than a contiguous pixels threshold, classifying the detected object as a false detection and removing the false detection.

5. The method of claim 1, further comprising:
   determining a total number of detected objects in the target area; and in response to the total number of the detected objects exceeding a glint threshold, classifying the detected objects as false detections and removing the false detections.

6. The method of claim 1, further comprising:
comparing the radiance of the pixel in the first spectral band with a radiance threshold; and
validating the detection when the radiance exceeds the radiance threshold.

7. The method of claim 1, further comprising:
retrieving a high resolution image of an area comprising the detected object; and
displaying on a user interface the high resolution image along with a detection image, wherein the detection image is representative of metrics of the plurality of pixels.

8. The method of claim 7, wherein the image data comprises multispectral (MSI) data from at least four bands and the high resolution image is a panchromatic image.

9. The method of claim 1, further comprising:
retrieving the image data from the storage system; and
calibrating the image data based on at least information retrieved with the image data.

10. The method of claim 1, wherein:
the image data corresponds to a plurality of target areas; and
the method further comprising repeating the determining and the detecting for the plurality of target areas.

11. The method of claim 1, further comprising:
providing a user interface to a user; and
receiving via the user interface one or more thresholds, wherein the one or more thresholds are used to validate the detected object.

12. The method of claim 1, wherein, the man-made object comprises a vessel or a boat.

13. A system, comprising:
a memory configured to store image data associated with a target area over water, wherein the image data comprises radiance of a plurality of pixels in a first spectral band and in a second spectral band, wherein the first spectral band comprises a near infrared (NIR) band and the second spectral band comprises a red band; and
a processor configured to:
determine a normalized difference vegetation index (NDVI) metric corresponding to a pixel as a function of the radiance in the first spectral band and the radiance in the second spectral band,
compare the metric with a threshold, and
detect a man-made object in the target area in response to a determination that the metric exceeds the threshold.

14. The system of claim 13, wherein:
the processor is further configured to:
detect a set of contiguous pixels representing the object, wherein each metric corresponding to each pixel of the set of contiguous pixels exceeds the threshold; and
in response to a number of pixels in the set of the contiguous pixels being less than a contiguous pixels threshold, classify the detected object as a false detection and remove the false detection.

15. The system of claim 13, wherein the processor is further configured to:
determine a total number of detected objects in the target area; and
in response to the total number of the detected objects exceeding a glint threshold, classify the detected objects as false detections and remove the false detections.

16. The system of claim 13, wherein the processor is further configured to:
compare the radiance of the pixel in the first band with a radiance threshold; and
validate the detection in response to the radiance exceeding the radiance threshold.

17. A non-transitory computer readable medium comprising stored instructions, which when executed by a processor, cause the processor to:
acquire image data associated with a target area over water, wherein the image data comprises radiance of a plurality of pixels in a first spectral band and in a second spectral band, wherein the first spectral band comprises a near infrared (NIR) band and the second spectral band comprises a red band;
determine a normalized difference vegetation index (NDVI) metric corresponding to a pixel as a function of the radiance in the first spectral band and the radiance in the second spectral band;
compare the metric with a threshold; and
detect a man-made object in the target area in response to a determination that the metric exceeds the threshold.

* * * * *